(12) United States Patent
Kato et al.

(10) Patent No.: US 6,649,872 B2
(45) Date of Patent: Nov. 18, 2003

(54) FLUX-CORED WIRE FOR GAS SHIELDED ARC WELDING

(75) Inventors: Tsuyoshi Kato, Narashino (JP); Takumi Koumoto, Narashino (JP); Yuji Suzuki, Narashino (JP); Toshiyuki Miyake, Narashino (JP); Rikiya Takayama, Narashino (JP); Toshihiko Chiba, Narashino (JP); Atsutada Hongo, Narashino (JP)

(73) Assignee: Nippon Steel Welding Products and Engineering Co., Ltd., Tokyo (JP)

( * ) Notice: Subject to any disclaimer, the term of this patent is extended or adjusted under 35 U.S.C. 154(b) by 0 days.

(21) Appl. No.: 09/955,984

(22) Filed: Sep. 20, 2001

(65) Prior Publication Data
US 2003/0094444 A1 May 22, 2003

(51) Int. Cl.⁷ .............................................. B23K 35/02
(52) U.S. Cl. .............................. 219/145.22; 219/146.1
(58) Field of Search ......................... 219/145.22, 146.1, 219/146.24; 148/23

(56) References Cited

U.S. PATENT DOCUMENTS 5,903,814 A * 5/1999 Miura et al. ................. 428/552

FOREIGN PATENT DOCUMENTS

| EP | 431904 | * 6/1991 | ......... B23K/35/368 |
| JP | 51-1659 | 1/1976 | |
| JP | 6-218577 | 8/1994 | |

OTHER PUBLICATIONS

Abstract of JP 06–218577 (Aug. 9, 1994).
Abstract of JP 51–1659 (Jan. 19, 1976).

* cited by examiner

Primary Examiner—M. Alexandra Elve
(74) Attorney, Agent, or Firm—Wenderoth, Lind & Ponack, L.L.P.

(57) ABSTRACT

An object of the present invention is to provide a flux-cored wire for gas shielded arc welding, which has merits of both solid wire and flux-cored wire, the merits being high depositing properties and a small amount of slag generated of solid wire and stable welding workability of flux-cored wire. A flux-cored wire for gas shielded arc welding, in which flux is filled in a steel sheath, containing 0.3 to 1.8% (total wire mass percentage, the same rule applies to the following) of Si, 0.8 to 4.0% of Mn, and 0.15 to 2.0% of a synthetic material containing $Na_2O$ and $TiO_2$ or a synthetic material containing $Na_2O$, $SiO_2$ and $TiO_2$ as an arc stabilizer, with a flux filling percentage of 3 to 10% by mass.

6 Claims, 2 Drawing Sheets

FLUX-CORED WIRE FOR GAS SHIELDED ARC WELDING

BACKGROUND OF THE INVENTION

1. Field of the Invention

The present invention relates to a flux-cored wire for gas shielded arc welding, which is used for welding of buildings, bridges, ships, and other various steel structures. More particularly, it relates to a flux-cored wire for gas shielded arc welding, which provides high welding workability including a very good arc condition and less spatter in welding of high heat input and high interpass temperature.

2. Description of Related Art

Conventionally, wires for gas shielded arc welding are classified into two types: a solid wire and a flux-cored wire.

For the solid wire for arc welding, various types of wires in which the components are controlled according to the purpose for use have been developed, and are generally used by being standardized in JIS Z3312 and other standards. The flux-cored wire for arc welding is classified into two groups: a generally called slag-based wire in which slag components are mainly filled and a generally called metal-based wire in which metal components are mainly filled. The flux-cored wire has been standardized in JIS Z3313 and other standards, and many kinds of flux-cored wires suited to various purposes have been developed.

However, since the solid wire is a metal wire, even if it is desired to contain a minute amount of an arc stabilizer to further improve the welding workability, the arc stabilizer cannot be contained.

On the other hand, the flux-cored wire can achieve high welding workability by the improvement in flux filled in the wire, so that many kinds of wires with high welding workability have been used practically. Almost all of the wires have a flux filling percentage of 10 to 20%. Although the disclosures of technology regarding a wire with a low filling percentage of 5% have been found sometimes, the wire with such a low filling percentage has problems of an excessive amount of welding slag, an excessive amount of fume generated, and the like. Actually, therefore, the wire with such a low filling percentage has not been supplied practically. Of the flux-cored wires, the metal-based flux-cored wire, which mainly contains metal powder to give welding workability as high as that of the solid wire, actually has problems of arc stability and productivity.

As described above, these types of wires have both merits and demerits. Therefore, a small-diameter wire for gas shielded arc welding, in which the merits of both solid wire and flux-cored wire are adopted, is desired.

For the flux-cored wire, a flux-cored wire with a low flux filling percentage, for example, filled with flux in the range of 5 to 25% in terms of percentage of cross-sectional area of wire has been disclosed in Japanese Patent Publication No. 51-1659. This Publication describes an example in which the flux filling percentage is as low as 5%, and has disclosed a wire filled with flux containing an indispensable component of graphite as an arc stabilizer, containing Ti, Al, Mg, etc. with a compounding ratio of 2 to 10%, and further containing 20 to 90% of a deoxidizer with no metal oxides being contained substantially. However, the arc stabilizer containing graphite is a cause for arc instability caused by CO reaction of the graphite with oxygen in wire or oxygen adhering to the wire surface, and provides coarse arc, so that the welding workability is deteriorated, and the amount of spatter generated is increased. Also, the content of C yielded in weld metal becomes excessive, so that the control of physical properties of weld metal is not easy.

Also, Unexamined Japanese Patent Publication No. 6-218577 has disclosed a flux-cored wire filled with flux containing 40 to 60% of a deoxidizer consisting of iron alloy powder of 40 to 60% of iron powder and Si, Mn and Ti, in which the content of Mn and S and the Mn/S ratio are restricted, and the flux filling percentage is 5 to 30%. This wire belongs to a metal-based flux-cored wire. For the wire with a filling percentage of 5% to 10%, a sufficiently stable arc cannot be obtained by the flux containing this metal powder, so that high welding workability and a satisfactory welding result as the flux-cored wire cannot be obtained.

SUMMARY OF THE INVENTION

An object of the present invention is to provide a flux-cored wire for gas shielded arc welding, which has merits of both solid wire and flux-cored wire, the merits being high depositing properties and a small amount of slag generated of solid wire and stable welding workability of flux-cored wire.

The inventors have solved a problem of arc stability by promoting the release of globules at the time of welding, decreasing the sizes of globules, and increasing the number of transfers of globules by containing an arc stabilizer containing a synthetic material consisting of $Na_2O$ and $TiO_2$ and/or a synthetic material consisting of $Na_2O$, $SiO_2$ and $TiO_2$ in a deoxidizer consisting of Si and Mn, and have solved problems of low deposition efficiency, shallow welding penetration, a large amount of slag generated, etc., which are drawbacks of the flux-cored wire, by decreasing the flux filling percentage to 3 to 10%. Thereupon, we have obtained an knowledge that the flux-cored wire is a very effective means for an entirely new flux-cored wire for arc welding, and thus have completed the present invention.

The present invention relates to a flux-cored wire for gas shielded arc welding and, more particularly, to a wire in which flux is filled in a steel sheath. A first mode of the present invention provides a flux-cored wire for gas shielded arc welding, in which flux is filled in a steel sheath, containing 0.3 to 1.8% (total wire mass percentage, the same rule applies to the following) of Si, 0.8 to 4.0% of Mn, and 0.15 to 2.0% of a synthetic material containing $Na_2O$ and $TiO_2$ and/or a synthetic material containing $Na_2O$, $SiO_2$ and $TiO_2$ as an arc stabilizer, with a flux filling percentage of 3 to 10% by mass.

A second mode of the present invention provides the flux-cored wire for gas shielded arc welding defined in the above-mentioned first mode, in which the filling flux contains 0.3% or less of $Na_2O$ source on a $Na_2O$ conversion value basis and/or 1.5% or less of $TiO_2$ and/or the source on a $TiO_2$ conversion value basis, in addition to the synthetic material containing $Na_2O$ and $TiO_2$ or the synthetic material containing $Na_2O$, $SiO_2$ and $TiO_2$.

A third mode of the present invention provides the flux-cored wire for gas shielded arc welding defined in the above-mentioned first mode, in which the wire further contains 0.02 to 0.15% of C, 0.02 to 0.3% of Ti, and 0.001 to 0.01% of B on a basis of total wire mass percentage.

A fourth mode of the present invention provides the flux-cored wire for gas shielded arc welding defined in the above-mentioned third mode, in which the wire further contains one or two and more kinds of 0.7% or less of Mo, 1.75% or less of Ni, and 1.0% or less of Cr on a basis of total wire mass percentage.

Furthermore, the present invention provides a flux-cored wire for gas shielded arc welding in which iron powder is contained in the filling flux.

Also, the present invention provides the above-described flux-cored wire for gas shielded arc welding in which the steel sheath has no butt or has a butt.

Also, the present invention provides the above-described flux-cored wire for gas shielded arc welding in which the steel sheath is copper plated or is not plated.

DETAILED DESCRIPTION OF THE PREFERRED EMBODIMENTS

Figure 1:
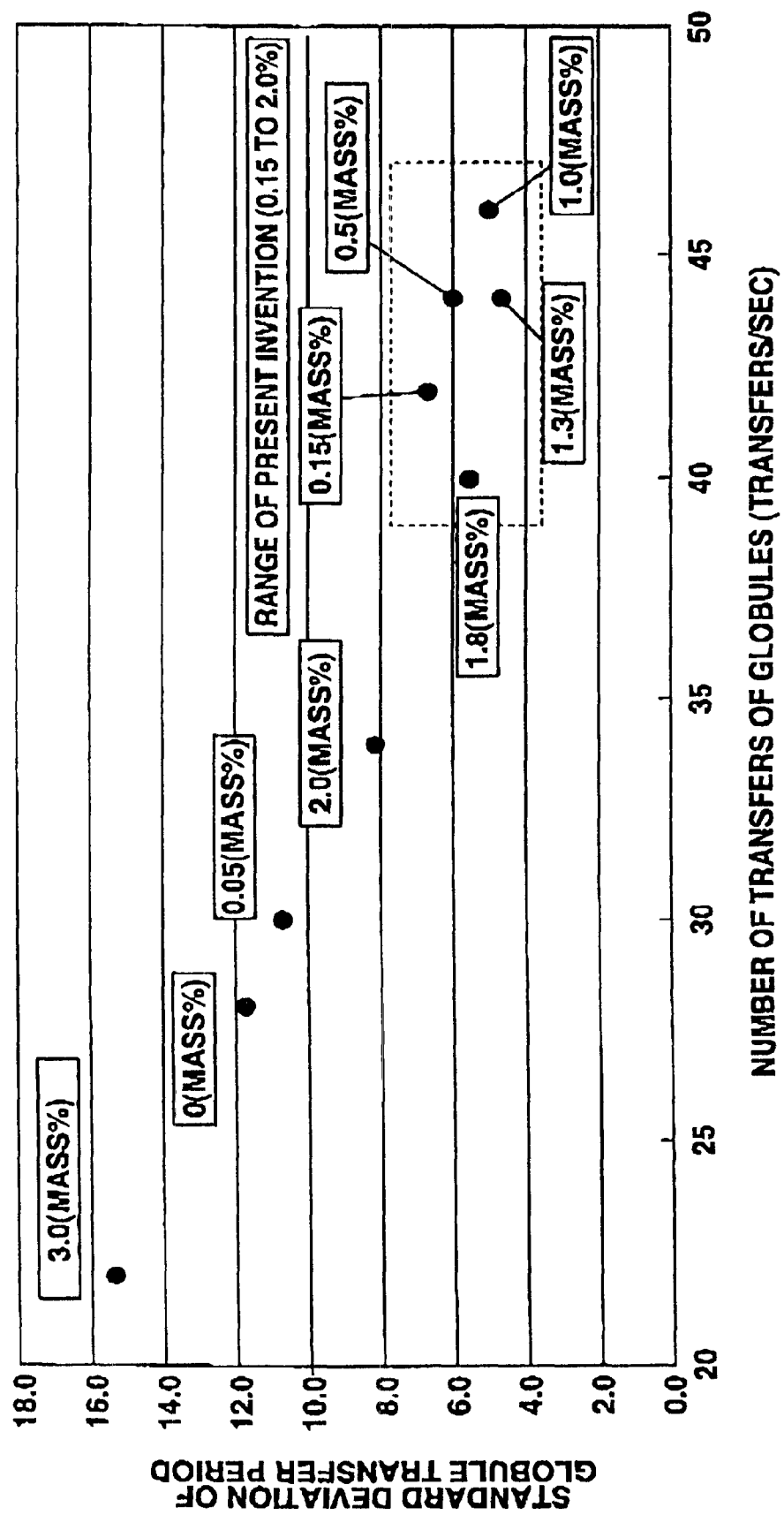
FIG. 1 is a diagram showing the result of investigation conducted to investigate effects of a synthetic material containing $Na_2O$ and $TiO_2$ in filling flux on t he number of transfers of globules and the standard deviation of globule transfer period.

The following is a description of reasons for limitation of components etc. of the flux-cored wire in accordance with the present invention.

Si: 0.3 to 1.8% of Si is used as a deoxidizer, and has an effect of decreasing the amount of oxygen in weld metal. However, if the content of Si is less than 0.3%, the deoxidizing force is insufficient, so that blowholes are produced in weld metal. Also, if the content of Si exceeds 1.8%, the sizes of globules increase, so that the spatter decreasing effect is eliminated, and further the amount of Si in weld metal becomes excessive, by which the crystal grains are coarsened, and thus the toughness is deteriorated. The addition of Si to either or both of the steel sheath and the filling flux has the same effect.

Mn: 0.8 to 4.0% of Mn promotes deoxidization of weld metal, and increases the flowability of weld metal, so that the shape of weld bead is improved. The Mn yielded in weld metal has effects of controlling the mechanical properties of weld metal and enhancing the tensile strength thereof. In order to achieve these effects, 8% or more of Mn must be added. However, if the content of Mn exceeds 4.0%, the sizes of globules increase, so that the spatter decreasing effect is eliminated. Also, the amount of Mn in weld metal becomes excessive, so that the strength of weld metal becomes excessive, and thus cracks become liable to be developed. The addition of Mn to either or both of the steel sheath and the filling flux has the same effect.

Si and Mn can be added into the filling flux in a state of metallic Si, metallic Mn, or an iron alloy such as Fe—Si, Fe—Si—Mn, or Fe—Mn. The conversion value of Si and Mn represents the content thereof in the filling flux.

The added amounts of Si and Mn on a basis of total wire mass percentage are as described above. The addition of Si and Mn to either or both of the steel sheath and the filling flux has the same effect, and the deoxidizing force at the welding time and the amount yielded in weld metal are not so different. However, when either of Si and Mn is added to the sheath in large amounts, the electrical resistivity of the sheath increases in proportion to the amount. The wire feed speed at the welding time increases as compared with the case where Si or Mn is added to the filling flux. When Si and Mn are contained in the steel sheath, restrictions should preferably be imposed as described below.

The content of Si should preferably be 1.2% or less. The reason for this is that if the amount of Si added in the sheath exceeds 1.2% with respect to the sheath weight, the hardness is high and work hardening occurs easily, so that the workability is deteriorated, formation becoming difficult to do, and thus the wire is liable to be broken at the time of drawing, whereby the yield is decreased. Therefore, the content of Si of 1.2% or less in the sheath is desirable in order to maintain the productivity.

The content of Mn should preferably be 2.5% or less. The reason for this is that if the amount of Mn added in the sheath exceeds 2.5% with respect to the sheath weight, the hardness is high and work hardening occurs easily, so that the workability is deteriorated, formation becoming difficult to do, and thus the wire is liable to be broken at the time of drawing, whereby the yield is decreased. Therefore, the content of Mn of 2.5% or less in the sheath is desirable in order to maintain the productivity.

When both Si and Mn are contained, the total content of these metals should preferably be 3% or less. The reason for this is that if the total amount of Si and Mn added in the sheath exceeds 3% with respect to the sheath weight, the hardness is high and work hardening occurs easily, so that the workability is deteriorated, formation becoming difficult to do, and thus the wire is liable to be broken at the time of drawing, whereby the yield is decreased remarkably. Therefore, the total content of Si and Mn of 3% or less in the sheath is desirable in order to maintain the productivity.

The following is a description of the added amount and effects of an arc stabilizer.

The content of a synthetic material containing $Na_2O$ and $TiO_2$ and/or a synthetic material containing $Na_2O$, $SiO_2$ and $TiO_2$ is 0.15 to 2.0%. If the content is less than 0.15%, the sizes of globules increase and the variations in size thereof become large as in the case of welding using a solid wire, so that the arc condition becomes unstable, and the amount of spatter generated increases. Therefore, the welding workability cannot be improved more than the case where the solid wire is used. On the other hand, if the content exceeds 2.0%, the arc length increases than necessary, with the result that the amount of spatter generated increases and also the amount of fume generated increases. Therefore, in the content range of 0.15 to 2.0%, the arc condition during welding is very good, the sizes of globules are small, and the amount of spatter generated is very small.

A synthetic material containing $Na_2O$ and $TiO_2$ or a three-component synthetic material further containing $SiO_2$ can achieve the same effect even if the ratio of $Na_2O$ to $TiO_2$ is changed variously, and is embraced in the technical concept of the present invention. A typical example of the synthetic material containing $Na_2O$ and $TiO_2$ is sodium titanate ($mNa_2O \cdot nTiO_2$). This material is a synthetic material obtained, for example, by blending sodium hydroxide and rutile at a desirable ratio and by treating the blended material at a high temperature. The synthetic material preferably contains 10 to 50% of $Na_2O$ and 50 to 90% of $TiO_2$. Also, when $SiO_2$ is contained, the content of $SiO_2$ preferably is 30% or less. For example, there can be cited synthetic materials containing $13Na_2O$—$80TiO_2$, $20Na_2O$—$73TiO_2$, $42Na_2O$—$53TiO_2$, $Na_2O$—$TiO_2$, $Na_2O$—$3TiO_2$, $Na_2O$—$6TiO_2$, or $13Na_2O$—$25SiO_2$—$58TiO_2$ as a major ingredient. The ratio of $Na_2O$ to $TiO_2$ is not limited to the aforementioned examples, and the ratio can be controlled arbitrarily. Also, the synthetic material containing $SiO_2$ such as $13Na_2O$—$25SiO_2$—$58TiO_2$ (sodium silicate titanate) increases the flowability of slag and covers the bead surface uniformly so that a satisfactory bead is formed.

The following is a description of the reason for adding 0.3% or less of $Na_2O$ on a $Na_2O$ conversion value basis in the arc stabilizer. This $Na_2O$, which is an additive other than the synthetic material containing $Na_2O$ and $TiO_2$ or the synthetic material containing $Na_2O$, $SiO_2$ and $TiO_2$, has effects of decreasing fluctuations in arc length during welding and promoting the increase in the number of transfers of globules and the decrease in globule size. However, if the added amount exceeds 0.3%, there is a tendency of decreasing the number of transfers of globules and increasing the arc length only. As a result, the amount of spatter generated increases. As the $Na_2O$ source, sodium carbonate, soda glass, etc. can be cited.

The following is a description of the reason for adding 1.5% or less of $TiO_2$. This $TiO_2$, which is an additive other than the synthetic material containing $Na_2O$ and $TiO_2$ or the synthetic material containing $Na_2O$, $SiO_2$ and $TiO_2$, has an effect of promoting the downward electromagnetic pinch effect for stabilizing the globule transfer by expanding the generation area of arc generated at the tip end of globule as an arc stabilizer. However, if the added amount exceeds 1.5%, the downward electromagnetic pinch effect becomes excessive, which makes the globule transfer unstable. Also, the amount of reduced Ti yielded in weld metal becomes excessive, which has an influence on the properties of weld metal. As the $TiO_2$ source, rutile, titanium slag, ilumenite, etc. can be cited.

Iron powder contained in the filling flux is added to increase the deposition rate and/or to control the filling percentage. The iron component can preferably be contained so that the content thereof is 5% or less. This iron component is a total value of iron component of iron alloy that is a raw material of Si and Mn of deoxidizer and iron powder. The iron component brought about by the addition of Si and Mn in the filling flux can be eliminated by the use of metallic Si, metallic Mn, or a Si—Mn alloy as the Si and Mn sources added into the filling flux.

The aforementioned materials are basic ingredients constituting the present invention. A deoxidizer such as Al, Mg or Zr is contained to prevent blowholes from being produced by insufficient deoxidization of weld metal and/or to control the mechanical properties as in the case of the ordinary flux-cored wire for gas shielded arc welding. However, if such metals are contained excessively, the removability of slag becomes poor due to the sticking of weld slag, the bead appearance becomes bad, or the strength of weld metal becomes excessive so that the crack resistance is deteriorated. Although the deoxidizer serves as an alloy yielded in weld metal, it is oxidized into slag, so that it sometimes affects the composition and generated amount of molten slag and impairs the object and effects of the present invention. Therefore, it is desirable to appropriately restrain the kind and content of the deoxidizer.

According to the present invention, in order to control the mechanical properties of weld metal, as the welding wire matching the steel plate to be welded, C, Ti and B, or one or two and more kinds of alloy components of Mo, Ni and Cr as necessary, or a slag removing agent such as Bi and S can be added appropriately in the filling flux and the steel sheath in an extent such that no influence is exerted on the basic technical concept of the present invention. These alloy components is preferably added into the filling flux from the viewpoint of the production efficiency.

C: 0.02 to 0.15% of C is added. C is one of most important elements for controlling the strength of weld metal due to solution strengthening, and relates greatly to the toughness. Therefore, if the added amount of C is less than 0.02%, necessary strength cannot be secured in welding of high heat input and high interpass temperature. Also, if the added amount of C exceeds 0.15%, the structure of weld metal is made martensite, so that the strength increases excessively and the toughness is deteriorated. Therefore, spatter is produced in large amounts, which decreases the welding workability.

Ti: 0.02 to 0.3% of Ti is added. Ti serves to make the structure of weld metal fine, so that it is an indispensable element for improving the strength and toughness of weld metal. Therefore, in welding of high heat input and high interpass temperature, if the added amount of Ti is less than 0.02%, the structure is not made fine, so that necessary toughness cannot be secured. However, if the added amount of Ti exceeds 0.3%, the toughness is decreased by the increase in strength of weld metal, and also the strength is increased excessively.

B: 0.001 to 0.01% of B is added. B is an essential element for obtaining high toughness of weld metal by the addition made simultaneously with the addition of Ti. Therefore, Ti and B are added at the same time. If the added amount of B is less than 0.001% (10 ppm), a fine structure is not formed, so that increased toughness cannot be achieved. However, if the added amount of B exceeds 0.01% (100 ppm), the hardness of weld metal increases, which brings about excessive strength and decreased toughness.

Mo:0.7% or less of Mo is added. Mo is an important element for making the structure of weld metal to fine and securing the strength in welding of high heat input and high interpass temperature. However, because the excessive addition causes excessive strength and decreased toughness of weld metal, the upper limit was set at 0.7%.

Ni: 1.75% or less of Ni is added. Ni serves to increase the strength of weld metal due to solution strengthening and to improve the corrosion resistance and toughness. However, the addition exceeding 1.75% brings about excessive strength, which causes hot cracking.

Cr: 1.0% or less of Cr is added. Cr is an important element for securing the strength in welding of high heat input and high interpass temperature, like Mo. It serves to increase the heat resistance, corrosion resistance, and weather resistance of weld metal. However, the addition exceeding 1.0% brings about excessive strength and decreased toughness of weld metal. Therefore, the upper limit was set at 1.0%.

These alloy components of Mo, Ni and Cr can be added singly or combinedly according to the purpose for improving the mechanical properties and physical values of weld metal. Also, the same object and effects can be achieved by containing these alloy components in the component of steel sheath considering the material yielded in weld metal in a range of being allowed in terms of the workability.

Figure 3A:
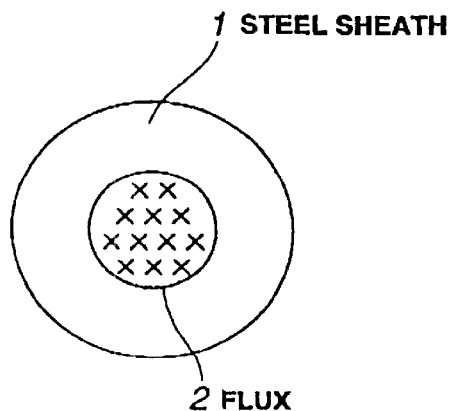
FIG. 3 is sectional views of flux-cored wires for gas shielded arc welding in accordance with the present invention, FIG. 3(a) showing a wire having no butt, and FIG. 3(b) showing a wire having a butt.
Figure 3B:
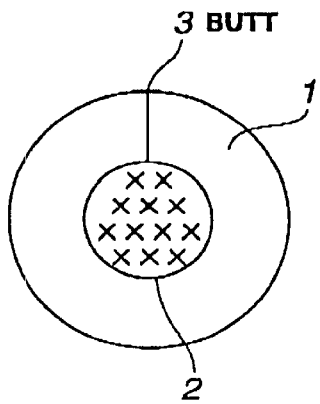

The cross-sectional shape of the flux-cored wire in accordance with the present invention is shown in FIGS. 3(*a*) and 3(*b*). The flux-cored wire shown in FIG. 3(*a*) is manufactured as described below. A steel sheath 1 formed of a steel pipe is filled with filling flux 2 while being vibrated, and then the diameter of the steel sheath 1 is decreased to form a wire. Further, the wire is drawn into a predetermined diameter of 0.8 to 2.0 mm. Alternatively, a hoop is formed into a U shape, being filled with flux, and is formed into an O shape successively in the formation process. Then, welding is performed, and the diameter of welded sheath is decreased to form a wire. Subsequently, the wire is drawn to produce a flux-cored wire for gas shielded arc welding without a butt on the steel sheath 1. Since this steel sheath has no butt, moisture in the air is not absorbed, so that satisfactory properties of weld metal can be obtained.

Also, the wire in which a steel sheath 1 having a butt 3 is filled with flux 2 shown in FIG. 3(*b*) is manufactured as described below. A hoop is formed into a U shape, being filled with flux, and is formed into an O shape successively in the formation process. Subsequently, the diameter is sheath is decreased to form a wire, and the wire is further drawn. This wire has a wide contact area of sheath butt because of a low filling percentage, so that the effect of shutting off filling flux from the air is great. As a result, the absorption of moisture in the air is very low. The shape of the butt of steel sheath is not limited to that shown in the figure, and a slantwise butt can also be adopted. In this case, the effect of shutting off the flux from the air is increased further.

By copper plating the surface of steel sheath, the rust-proofing property of sheath surface is improved. Also, the wire feeding property and the conductivity can be improved. For the wire the surface of which is not copper plated, a preservative and lubricant are stuck appropriately on the surface of wire to secure the rust-proofing property and wire feeding property.

The flux filling percentage of the flux-cored wire in accordance with the present invention is 3 to 10%. If the filling percentage is less than 3%, flux filling and formation are difficult to do, so that the productivity is decreased. If the filling percentage exceeds 8%, the amount of slag generated and the amount of spatter generated increase, and the performance of wire cannot be improved. Also, the drawing property at the time of wire manufacture is deteriorated, resulting in a decrease in productivity due to broken wire. The filling percentage is preferably 3.5 to 7.0% in order to further improve the productivity, the generation of slag, and the workability.

The diameter of the flux-cored wire in accordance with the present invention is preferably 0.8 to 2.0 mm in order to increase the current density at the time of welding and to obtain a high deposition rate. The small-diameter wire with a low flux filling percentage can widen the welding current range. For example, the wire of 1.2 mm in diameter can attain a welding current range of 120 to 550 A. Thereby, the work efficiency can be improved significantly.

At the time of arc welding using the flux-cored wire in accordance with the present invention, sufficient welding workability can be obtained by using $CO_2$ gas as a shield gas. Moreover, Ar—$CO_2$ mixed gas may be used from the viewpoint of welding work environment because this gas decreases fume.

Next, a manufacture example of the flux-cored wire for gas shielded arc welding in accordance with the present invention will be described.

As the manufacturing method for the flux-cored wire having no butt in accordance with the present invention, there is available a method in which a steel sheath having no butt, which is formed of a steel pipe, is set on a vibrator in a coil form, and is filled with filling flux while being vibrated, and then the diameter of the sheath is decreased to form a wire, which is then drawn into a predetermined diameter of 0.8 to 2.0 mm, or a method in which a hoop is formed into a U shape, being filled with flux, and is formed into an O shape successively in the formation process, and thereafter, the sheath is welded into a pipe form and the diameter of sheath is decreased to form a wire, and subsequently the wire is further drawn.

Also, the flux-cored wire having a butt is manufactured as follows: A hoop is formed into a U shape, being filled with flux, and is formed into an O shape successively in the formation process. Subsequently, the diameter of sheath is decreased to form a wire, and the wire is further drawn. In these manufacturing methods, an ordinary annealing process is carried out appropriately during the drawing process.

In order to investigate the performance of the flux-cored wire in accordance with the present invention, there were prepared filling flux in which five kinds of 0.15%, 0.5%, 1.0%, 1.3%, and 1.8% of a synthetic material (13$Na_2O$—80$TiO_2$) formed of $Na_2O$ and $TiO_2$ were contained as an arc stabilizer with a deoxidizer containing 0.5% of Si and 1.5% of Mn being used as a base to control the components so as to be in the range of the present invention; and four kinds of filling flux in which the content of the aforementioned synthetic material was set at 0% and 0.05%, which were less than the lower limit of the range of the present invention, and filling flux in which the content of the aforementioned synthetic material was set at 2.2% and 3.0%, which were more than the upper limit of the range of the present invention. This flux was filled in a pipe (chemical composition C: 0.05%, Si: 0.01%, Mn: 0.30%, P: 0.01%, S: 0.01%) denoted by a sheath symbol P1 in Table 1 with a flux filling percentage of 5%, and the pipe was drawn into an outside diameter of 1.2 mm, by which a flux-cored wire was manufactured on a trial basis. By using this wire, welding was performed under the conditions of welding current: 300 A, arc voltage: 33 V, welding speed: 30 cm/min, wire extension length: 20 mm, shielding gas: $CO_2$, and flow rate: 25 L/min, and the number of transfers of globules and the amount of spatter generated during welding were investigated.

To investigate the number of transfers of globules, the weld portion was photographed with a high-speed video camera while automatic welding was performed, the result was played back at a slow speed, and the number of transfers was measured with the time period from the generation of globule at the tip end of wire to the release of the globule being taken as one cycle. The conditions for photographing the weld portion were number of frames of photograph: 1000 frames/sec and shutter speed: 1/3000 sec. The photographing result was played back at a slow speed, and the number and time of transfers were measured with the time period from the generation of globule at the tip end of wire to the release of the globule being taken as one cycle, and a standard deviation was determined. The investigation result is shown in FIG. 1.

As shown in FIG. 1, for the flux-cored wire containing filling flux (synthetic material containing $Na_2O$ and $TiO_2$: 0.15 to 2.0%) within the range of the present invention, the number of transfers of globules was 40 transfers/sec or more, and the standard deviation of globule transfer period was 7 or less, showing satisfactory results. However, for the wire in which the content of synthetic material containing $Na_2O$ and $TiO_2$ is set at a value smaller than the lower limit of the range of the present invention, the effect is little, that is, the number of transfers of globules decreases, and the standard deviation of globule transfer period increases. Also, for the wire in which the content of synthetic material is set at a value larger than the upper limit of the range of the present invention, likewise, the number of transfers of globules decreases, and the standard deviation of globule transfer period increases.

To investigate the amount of spatter generated, automatic welding was performed continuously for one minute, and spatter generated during welding was collected three times for one wire, by which the average value was obtained to undertake an evaluation.

Figure 2:
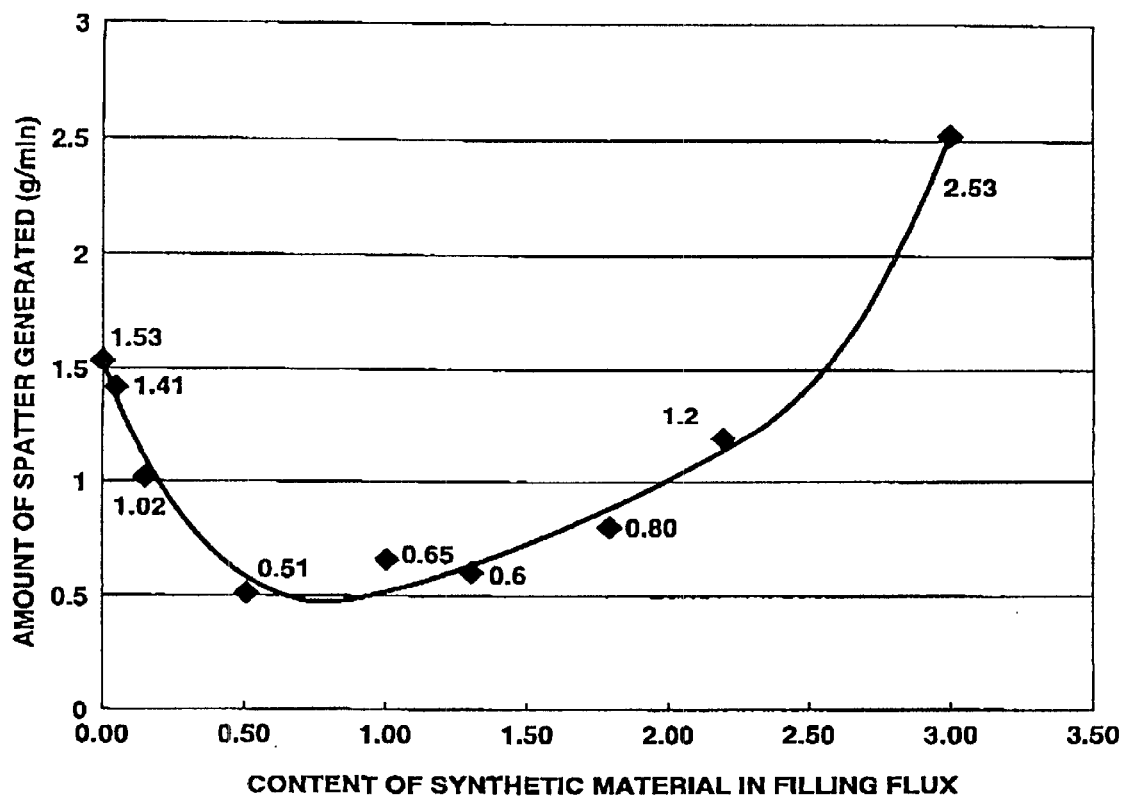
FIG. 2 is a diagram showing the result of investigation conducted to investigate an effect of a synthetic material containing $Na_2O$ and $TiO_2$ in filling flux on the amount of spatter generated.

The result of investigation of the amount of spatter generated is shown in FIG. 2. As shown in FIG. 2, when the content of synthetic material is within the range of the present invention (0.15 to 2.0%), the amount of spatter generated is as small as 1 g/min or smaller, showing a satisfactory result. However, for the wires of comparative examples in which the content of synthetic material is set at a value smaller than the lower limit of the range of the present invention, the effect of the synthetic material containing $Na_2O$ and $TiO_2$ is little, and the amount of spatter generated increases. Also, for the wires of comparative examples in which the content of synthetic material is set at a value larger than the upper limit of the range of the present invention, electrolytic dissociation in an arc atmosphere is promoted excessively, and thus the arc length increases, so that the globule transfer becomes unstable. As a result, the amount of spatter generated increases.

From the above-described results, if the content of synthetic material containing $Na_2O$ and $TiO_2$ or synthetic material containing $Na_2O$, $SiO_2$ and $TiO_2$ is within the range of the present invention (0.15 to 2.0%), globules are small in size and transfer stably, so that the amount of spatter generated can be decreased. However, for the wires of comparative examples manufactured on a trial basis by using filling flux whose content is outside either of the lower and upper limits of the present invention, globules are large in size and transfer in an unstable state, so that the amount of spatter generated increases.

EXAMPLES

Example 1

Next, the present invention will be described collectively by using examples and comparative examples.

Table 1 gives the compositions of mild steel pipes and hoops used in examples of the present invention and the comparative examples. For the wire having no butt of steel sheath, a mild steel pipe denoted by sheath symbol P1 in Table 1 was used, and for the wire having a butt of steel sheath, a hoop denoted by sheath symbol H1 in Table 1 was used. After flux having a composition given in Table 2 was filled, the sheath was rolled and drawn with a die, and then was subjected to intermediate annealing as softening and dehydrogenation. The wires excluding wire symbols 8, 9, 22 and 23 were plated, by which flux-cored wires having no butt of steel sheath were manufactured.

Table 1
Table 2

Wires W1 to W14 given in Table 2 are examples of the present invention, and wire W15 and subsequent wires are comparative examples.

As the welding conditions for the examples of the present invention and the comparative examples given in Table 2, conditions of welding current: 300 A, arc voltage: 33 V, welding speed: 30 cm/min, wire extension length: 20 mm, and $CO_2$ flow rate: 25 L/min were used to perform welding. In the welding operation, the amount of spatter generated, the number of transfers of globules, the standard deviation of globule transfer period, and the slag condition was investigated. To investigate the amount of spatter generated, welding was performed for one minute, and spatter generated during the welding was collected three times for one wire, by which the average value of collected amounts was obtained to undertake an evaluation.

To investigate the number of transfers of globules and the standard deviation of globule transfer period, the arc phenomenon during welding was photographed with a high-speed video camera, and the number of transfers of globules for one second, the sizes of globules, and the width of arc were measured. The measurement was made three times for one wire, and an evaluation was done by use of the average value. For the slag condition, the amount and removability of slag produced on weld bead after welding were investigated visually and by striking with a small hammer. To test the mechanical properties of weld metal, a tensile test piece (JIS Z 2201 No. A1) and an impact test piece (JIS Z 2242 No. 4) were prepared in accordance with JIS Z 3111.

Table 3 gives the results of welding test.
Table 3

For the wires in accordance with the present invention, which were denoted by W1 to W14, both of the number of transfers of globules and the standard deviation of globule transfer period were satisfactory, so that stable welding could be performed. As a result, the amount of spatter generated was small. Also, although the amount of slag produced on the bead surface was slightly larger than the case where a solid wire was used, the amount of slag generated was small, and the slag was produced uniformly and thinly on the whole of bead surface. Regarding the removability of slag, the slag could be removed easily by being struck lightly with a hammer. Thus, a good result was obtained.

Contrarily, the wires W15 to W28 of comparative examples had problems and the evaluation results thereof were bad as compared with the examples of the present invention.

For the wire W15, which did not contain the synthetic material consisting of $Na_2O$ and $TiO_2$, the arc stability and the workability were poor, the number of transfers of globules was as small as 26 transfers/sec, and the amount of spatter generated was not improved.

For the wire W16, the filling percentage was as low as 2%, so that necessary amount of flux could not be filled. Furthermore, since the content of Si is less than the lower limit of the range of the present invention, the deoxidizing effect in weld metal could not be obtained, so that blowholes were produced at a part of bead. Also, since the content of synthetic material consisting of $Na_2O$ and $TiO_2$, which is added as an arc stabilizer, is less than the lower limit of the range of the present invention, the effect as an arc stabilizer was little. That is, the number of transfers of globules was small, and the standard deviation of globule transfer period showed a large value. Therefore, the arc condition was unstable, and resultantly the amount of spatter generated increased.

For the wire W17, the filling percentage was as high as 10%, so that although the synthetic material consisting of $Na_2O$ and $TiO_2$ was added as an arc stabilizer, the effect as an arc stabilizer was excessive, and because the arc length was longer than necessary, the transfer of globule was not stabilized. Also, the standard deviation of globule transfer period showed a large value, so that the arc condition was unstable. As a result, the amount of spatter generated was large, being almost equal to that for the conventional wire. Also, the content of $TiO_2$ was high, and thus the amount of slag was excessive, so that the workability was poor.

For the wire W18, the arc was stable because the synthetic material consisting of $Na_2O$ and $TiO_2$ within the content range of the present invention was added as an arc stabilizer. However, the content of Si was high, so that Si in weld metal increased, by which the mechanical properties were reduced.

For the wire W19, since the content of the synthetic material consisting of $Na_2O$ and $TiO_2$ added as an arc stabilizer exceeded the range of the present invention, the effect as an arc stabilizer was excessive, and thus the arc length was longer than necessary, so that the transfer of globule was not stabilized. Also, the standard deviation of globule transfer period showed a large value, so that the arc condition was unstable. As a result, the amount of spatter generated increased.

For the wire W20, since the content of Mn is low, the deoxidization of weld metal was insufficient, and blowholes were produced, by which the mechanical strength decreased insufficient.

For the wire W21, since the content of $Na_2O$ exceeded the range of the present invention, the effect as an arc stabilizer was excessive, and thus the arc length was longer than necessary, so that the transfer of globule was not stabilized, and the arc condition was unstable. As a result, the amount of spatter generated increased.

For the wire W22, since the content of Mn exceeded the range of the present invention, there was no effect of the synthetic material containing $Na_2O$ and $TiO_2$, so that the amount of spatter generated was large, and the content of Mn in weld metal increased. Therefore, in the mechanical properties, the tensile strength was high, and the impact toughness was low.

For the wire W23, although the synthetic material containing $Na_2O$ and $TiO_2$ was added, the effect as an arc stabilizer was excessive, and thus the arc length was longer than necessary, so that the transfer of globule was not stabilized. The standard deviation of globule transfer period showed a large value, so that the arc condition was unstable, and resultantly the amount of spatter generated increased.

For the wire W24, which had a butt and was not plated, the content of the synthetic material consisting of $Na_2O$ and $TiO_2$ was high as in the case of the wire W23, so that the effect as an arc stabilizer was excessive, and thus the arc length was longer than necessary. Therefore, the transfer of globule was not stabilized, and the arc condition was unstable. As a result, the amount of spatter generated increased.

For the wire W25, which was a metal-based flux-cored wire, since no arc stabilizer was contained, the number of transfers of globules was small, and thus the arc was always unstable, so that the amount of spatter generated increased.

For the wires W26 and W27, which were a solid wire of JIS YGW12 and a solid wire of JIS YGW11, respectively, since the synthetic material consisting of $Na_2O$ and $TiO_2$ could not be contained, the number of transfers of globules was small, so that more stable arc condition was not obtained. Therefore, the amount of spatter generated did not decrease.

For the wire W28, which was a flux-cored wire with a conventional filling percentage, although the synthetic material consisting of $Na_2O$ and $TiO_2$ was contained, the content of $TiO_2$ was high, so that the amount of slag generated was large, and the number of transfers of globules was small. Therefore, more stable arc condition was not obtained, and thus the amount of spatter generated did not decrease so much.

Example 2

Next, the present invention will be described by using examples of wires in which the composition of mild steel pipe and hoop of sheath is difference from the composition of said Example 1. The pipes and hoops given in Table 1 were used, and flux was filled into the pipe sheath or the hoop sheath as shown in Table 4. Then, the same manufacturing method, welding method, and measuring method as those for the wires given in Table 2 were carried out.

Table 5 gives the welding results.

Table 4

Table 5

For the wires in accordance with the present invention, which were denoted by WP1 to WP3 and WH1 to WH4, both of the number of transfers of globules and the standard deviation of globule transfer period were satisfactory, so that stable welding could be performed. As a result, the amount of spatter generated was small.

Also, although the amount of slag produced on the bead surface was slightly larger than the case where a solid wire was used, the amount of slag generated was small, and the slag was produced uniformly and thinly on the whole of bead surface. Regarding the removability of slag, the slag could be removed easily by being struck lightly with a hammer. Thus, a good result was obtained.

Contrarily, wires WP4 and WH5 of comparative examples had problems and the evaluation results thereof were bad as compared with the examples of the present invention.

For the wire WP4, since the content of Si in the wire was 2.13% on a basis of total wire mass, exceeding the range of the present invention, the sizes of globules were large, and the standard deviation of globule transfer period showed a large value, so that the arc condition was unstable. As a result, the amount of spatter generated increased. Also, the content of Si in weld metal was excessive, so that the mechanical properties were reduced.

For the wire WH5, since the content of Mn in the wire was 4.32% on a basis of total wire mass, exceeding the range of the present invention, the sizes of globules were large, the number of transfers of globules was small, and the standard deviation of globule transfer period showed a large value, so that the arc condition was unstable. As a result, the amount of spatter generated increased.

Example 3

In the present invention and comparative examples, as mild steel pipes, P1, P2 and P3 denoted in Table 6 were used, and as hoops for wire having a butt, H1, H2 and H3 denoted in Table 6 were used. The compositions of these pipes and hoops are given in Table 6. After flux having a composition given in Table 7 was filled, the sheath was rolled and drawn with a die, and then was subjected to intermediate annealing as softening and dehydrogenation. The wire of 1.2 mm diameter mere obtained. The wires excluding wire symbols W1~6, W9~13, W17~25 and W30 were plated, by which flux-cored wires having no butt of steel sheath or flux-cored wires having a butt of W7, W14~16,and W26~29 were manufactured.

Table 6

Table 7

Wires W1 to W16 given in Table 7 are examples of the present invention, and wires W17 to W30 are comparative examples.

As the welding conditions for the examples of the present invention and the comparative examples, conditions of welding current: 400 A, arc voltage: 40 V, welding speed: 24 cm/min, heating value of heat input: 40 kJ/cm, interpass temperature: 350° C. or lower, wire extension length: 25 mm, and $CO_2$ flow rate: 25 L/min were used to perform welding. The edge shapes used were K1 and K2 given in Table 9. In the welding operation, the amount of spatter generated, the number of transfers of globules, the standard deviation of globule transfer period, the slag condition, and the depth of penetration were investigated. The chemical composition of weld steel plate is given in Table 8. Steel plates of thickness 20 mm×width 60 mm×length 400 mm used for welding are B1 and B2 given in Table 8.

To investigate the amount of spatter generated, the number of transfers of globules, the standard deviation of globule transfer period, the slag condition, and the depth of penetration, welding was performed by use of steel plate B1 under the above-described welding conditions, by which evaluation was done.

To investigate the amount of spatter generated, continuous welding was performed for one minute, and spatter generated during the welding was collected three times for one wire, by which the average value of collected amounts (g/min) was obtained to undertake an evaluation. When the average value was under 1.0 g/min, the welding condition was evaluated with good condition.

To investigate the number of transfers of globules and the standard deviation of globule transfer period, the arc phenomenon during welding was photographed with a high-speed video camera, and the number of transfers of globules for one second, the sizes of globules, and the width of arc were measured. The measurement was made three times for one wire, and an evaluation was done by use of the average value. When the number of transfers of globules was over 40 times/see, the welding condition was evaluated with good condition.

For the slag condition, the amount and removability of slag produced on weld bead after welding were investigated visually and by striking with a small hammer.

To investigate the depth of penetration, bead-on-plate welding was performed. The weld bead was cut perpendicularly to the bead, and the section was ground and corroded. Thereby, the penetration condition was observed, and the distance from the surface of steel plate to the lowermost part of penetration was measured. The measurement was made three times, and an evaluation of penetration depth was done by use of the average value. The depth of penetration over 6 mm was evaluated with good condition.

To test the mechanical properties of weld metal, a tensile test piece (JIS Z 2201 No. A1) and an impact test piece (JIS Z 2242 No. 4) were prepared in accordance with JIS Z3111.

Table 10 gives the results of welding test and evaluation of welding workability.

Table 8
Table 9
Table 10

For the wires in accordance with the present invention, which were denoted by W1 to W16, both of the number of transfers of globules and the standard deviation of globule transfer period were satisfactory, so that stable welding could be performed. As a result, the amount of spatter generated was small. Also, although the amount of slag produced on the bead surface was slightly larger than the case where a solid wire was used, the amount of slag generated was small, and the slag was produced uniformly and thinly on the whole of bead surface. Regarding the removability of slag, the slag could be removed easily by being struck lightly with a hammer. Further, the depth of penetration is greater than that for the conventional flux-cored wire, and is equivalent to that for the solid wire. Thus, a good result was obtained.

Contrarily, the wires W17 to W30 of comparative examples had problems and the evaluation results thereof were bad as compared with the examples of the present invention.

For the wire W17, the wire W17 contained small amount of the synthetic material containing $Na_2O$ and $TiO_2$, which did not reach the specified amount, the amount of spatter was as large as 1.45 g/min, and the number of transfers of globules during welding was as few as 36 transfers/sec. Furthermore, the standard deviation of globule transfer period was as large as 10.4, so that the arc condition was unstable. Moreover, as the Ti content of 0.34% was high content, the mechanical properties of weld metal become the poor toughness of $512N/mm^2$ and excessive high tensile strength of $612N/mm^2$.

For the wire W18, although 0.01% of C was added, the C content did not reach the specified amount. Therefore, the tensile strength of weld metal was low, and necessary strength could not be secured. Also, 0.5% of $Na_2O$ source as an arc stabilizer, was added excessively, which did not satisfy the condition. Therefore, the arc length increased unnecessarily, and as the result, the amount of spatter was as large as 1.36 g/min.

For the wire W19, regarding the arc stabilizer, 2.50% of synthetic material containing $Na_2O$ and $TiO_2$ exceeded the upper limit, so that the addition of arc stabilizer was excessive. Therefore, the arc length increased, so that the amount of spatter increased to 1.25 g/min. Further, as the Si content did not reach the specified amount, the blowholes arose in the welded metal, so that the tensile test resulted to the low elongation of 12.8%.

For the wire W20, regarding the arc stabilizer, 0.39% of $Na_2O$ source exceeded the upper limit. Therefore, the arc length increased, and the amount of spatter was as large as 1.23 g/min. Moreover, 1.95% of Si was added, which exceeded the upper limit, so that the toughness of welded metal was as low as $474N/mm^2$.

For the wire W21, regarding the arc stabilizer, the addition of 1.68% of the $TiO_2$ source exceeded the upper limit, so that the arc length increased, and the amount of spatter was as large as 1.26 g/min, so that the welding workability was not improved. Moreover, the amount of added Mn was as low as 0.76%, so that the flowability of welding metal was bad, and the bead had a projecting shape, and the toughness of welded metal was decreased.

For the wire W22, the filling percentage of flux was as low as 2.5%, which did not satisfy the condition of the present invention. Therefore, the arc was unstable, and, the amount of spatter was as large as 1.18 g/min. Also, the content of Ti was as low as 0.01%. Therefore, the toughness of welded metal was decreased.

For the wire W23, 12.0% of the filling percentage of flux was over the upper limit, which did not satisfied the condition of the present invention. The amount of slag and spatter was produced excessive, the slag on the bead could not peel effectively, and the depth of penetration was slight. Also, as the content of Mn was as large as 4.05%, the tensile strength was excessively high, and the high temperature clacks arose in the position of crater.

For the wire W24, the amount of C was as large as 0.16%. Therefore, the amount of spatter generated was as large as 1.19 g/min. Also, the tensile strength of 609N/mm was excessive and the toughness of welded metal was decreased.

For the wire W25, the amount of B was low as 5 ppm. Therefore, the toughness of welded metal was low.

For the wire W26, W27 and W29, the each of wires had the excessive high tensile strength, by which the toughness was decreased undesirably. The wire W26 contained B as large as 110 ppm, the wire W27 contained Mo as large as 0.75%, and the wire W29 contained Cr as large as 1.08%. The contents of B, Mo and Cr exceeded the upper limit of the present invention.

For the wire W28, the amount of Ni was as large as 1.79%. Therefore, the tensile strength of weld metal was excessive and the high temperature cracks arose in the position of crater.

For the wire W30, which was a solid wire and to which an arc stabilizer was not added, since specified amounts of Ti and B were added, the strength and toughness of weld metal were high. However, the arc condition was unstable as compared with the examples of the present invention. The amount of spatter, the number of transfers of globules, and the standard deviation of transfer period were at the same level as those for the conventional solid wire.

As described above, for the flux-cored wire for gas shielded arc welding in accordance with the present invention, the arc is very stable, the number of transfers of globules is large, and fine globules transfer to reduce the amount of spatter. Therefore, the flux-cored wire of the present invention further improves the advantages of the conventional solid wire and flux-cored wire. The welding workability and the weld bead shape are satisfactory, and the addition of alloy components can be controlled easily, so that the quality of weld portion can be upgraded, and the deposition efficiency can be increased. Therefore, the flux-cored wire of the present invention can contribute to increased efficiency of welding work for materials having different thickness and properties.

TABLE 1

| Sheath symbol | Sheath type | C | Si | Mn | P | S |
|---|---|---|---|---|---|---|
| P1 | pipe | 0.05 | 0.01 | 0.30 | 0.010 | 0.010 |
| P2 | " | 0.035 | 1.18 | 0.20 | 0.020 | 0.015 |
| P3 | " | 0.01 | 0.02 | 2.41 | 0.015 | 0.008 |
| H1 | Hoop | 0.04 | 0.01 | 0.25 | 0.010 | 0.010 |
| H2 | " | 0.033 | 0.50 | 1.00 | 0.022 | 0.007 |
| H3 | " | 0.02 | 0.72 | 2.15 | 0.010 | 0.014 |

TABLE 2

| Classification of invention | Wire symbol | Wire type | Plated or non-plated | Filling percentage (%) | Si | Mn | Synthetic material formed of Na₂O and TiO₂ Raw material | Content | Na₂O | TiO₂ | Iron powder | Iron component of alloy | Others |
|---|---|---|---|---|---|---|---|---|---|---|---|---|---|
| Example of present invention | W1 | Without butt | Plated | 3 | 0.4 | 1.0 | 13Na₂O—80Ti₁O₂ | 1.00 | — | — | — | 0.34 | Balance |
| | W2 | " | " | 3 | 0.3 | 0.8 | 13Na₂O—80Ti₁O₂ | 0.17 | — | — | 1.4 | — | Balance |
| | W3 | " | " | 7.5 | 0.8 | 1.9 | 13Na₂O—80Ti₁O₂ | 1.5 | — | — | 2.4 | 0.69 | Balance |
| | W4 | " | " | 4.5 | 0.5 | 1.5 | 13Na₂O—80Ti₁O₂ | 1.0 | 0.22 | — | — | 1.04 | Balance |
| | W5 | " | " | 5 | 0.5 | 1.5 | 13Na₂O—80Ti₁O₂ | 1.0 | — | 0.75 | — | 1.04 | Balance |
| | W6 | " | " | 6 | 0.7 | 1.8 | 13Na₂O—80Ti₁O₂ | 1.3 | 0.18 | 0.99 | — | 0.59 | Balance |
| | W7 | " | " | 7 | 1.0 | 2.0 | 13Na₂O—80Ti₁O₂ | 1.0 | 0.23 | 1.10 | 0.4 | 0.90 | Balance |
| | W8 | With butt | " | 6 | 0.7 | 1.8 | 13Na₂O—80Ti₁O₂ | 1.0 | 0.23 | 1.30 | — | 0.59 | Balance |
| | W9 | Without butt | Non-plated | 6 | 0.7 | 1.8 | 13Na₂O—80Ti₁O₂ | 1.0 | 0.25 | 1.30 | — | 0.59 | Balance |
| | W10 | " | Plated | 5 | 0.7 | 1.8 | 20Na₂O—73Ti₁O₂ | 1.0 | — | — | 0.7 | 0.59 | Balance |
| | W11 | " | " | 5 | 0.7 | 1.8 | 42Na₂O—53Ti₁O₂ | 1.0 | — | 0.20 | 0.5 | 0.59 | Balance |
| | W12 | " | " | 5 | 0.7 | 1.8 | 13Na₂O—58Ti₁O₂—25Si₁O₂ | 1.0 | 0.17 | — | 0.7 | 0.59 | Balance |
| | W13 | " | " | 6 | 0.7 | 1.8 | 13Na₂O—58Ti₁O₂—25Si₁O₂ | 0.7 | 0.13 | 0.32 | 1.4 | 0.59 | Balance |
| | W14 | " | " | 7 | 0.8 | 2.5 | 13Na₂O—80Ti₁O₂ | 0.6 | — | 1.10 | — | 1.70 | Balance |
| Comparative example | W15 | With butt | Plated | 4 | 0.3 | 0.9 | — | — | — | 0.08 | 2.0 | 0.48 | Balance |
| | W16 | " | " | 2 | 0.2 | 1.0 | 13Na₂O—80Ti₁O₂ | 0.1 | 0.03 | — | — | 0.52 | Balance |
| | W17 | " | " | 11 | 0.8 | 1.9 | 13Na₂O—80Ti₁O₂ | 1.5 | 0.35 | 1.80 | 2.5 | 0.71 | Balance |
| | W18 | " | " | 7 | 1.9 | 1.7 | 13Na₂O—80Ti₁O₂ | 0.9 | — | 0.20 | 0.4 | 1.44 | Balance |
| | W19 | " | " | 6 | 0.7 | 1.8 | 13Na₂O—80Ti₁O₂ | 2.2 | 0.23 | 0.05 | — | 0.59 | Balance |
| | W20 | " | " | 6 | 0.5 | 0.6 | 13Na₂O—80Ti₁O₂ | 1.0 | 0.23 | 0.20 | 2.5 | 0.48 | Balance |
| | W21 | " | " | 7 | 0.8 | 1.9 | 13Na₂O—80Ti₁O₂ | 0.9 | 0.48 | 1.30 | — | 0.48 | Balance |
| | W22 | " | " | 7.2 | 0.5 | 4.0 | 13Na₂O—80Ti₁O₂ | 0.6 | 0.22 | — | — | 0.99 | Balance |
| | W23 | " | " | 6 | 0.7 | 1.8 | 13Na₂O—58Ti₁O₂—25Si₁O₂ | 2.2 | 0.33 | 0.03 | — | 0.59 | Balance |
| | W24 | With butt | Non-plated | 6 | 0.7 | 1.8 | 13Na₂O—58Ti₁O₂—25Si₁O₂ | 2.2 | 0.23 | 0.20 | — | 0.59 | Balance |
| | W25 | With butt | " | 6 | 0.6 | 1.3 | — | — | — | — | 1.0 | 0.52 | Balance |
| | W26 | Solid | Plated | — | 0.6 | 1.3 | — | — | — | — | — | — | — |
| | W27 | " | " | — | 0.7 | 1.6 | — | — | — | 0.22 (Containing as N₂T₁) 6.00 | — | — | — |
| | W28 | Without butt | " | 15 | 1.0 | 2.0 | 13Na₂O—80Ti₁O₂ | 1.5 | 0.07 | — | 2.0 | 0.90 | Balance |

Remarks:
(1) Si and Mn include calculated values of Fe—Si:48, Fe—Si:21-Mn:62, Fe—Mn:75 alloys (used for only W4, 5, 12, 13, 14, 15 and 22).
(2) Other components: balance includes solid matters of water glass, minor components (C, P, S), impurities in raw material, etc.
(3) As water glass, potassium silicate is used for W1, 2, 3, 5, 10, 11, 12, 13, 15 and 18, and sodium silicate is used for others.

TABLE 3

| Classification of invention | Wire symbol | Arc condition | | Amount of spatter generated (g/min) | Slag condition | | Comprehensive evaluation |
|---|---|---|---|---|---|---|---|
| | | Number of transfers of globule (transfers/sec) | Standard deviation of globule transfer period | | Generated amount (note 1) | Removability (note 2) | |
| Example of present invention | W1 | 47 | 5.0 | 0.55 | Very small | Slightly low | Good |
| | W2 | 41 | 6.0 | 0.95 | Very small | Slightly low | Good |
| | W3 | 42 | 4.9 | 0.80 | Small | High | Good |
| | W4 | 45 | 6.2 | 0.78 | Small | High | Good |
| | W5 | 44 | 5.5 | 0.75 | Small | High | Good |
| | W6 | 45 | 4.7 | 0.61 | Small | High | Good |
| | W7 | 41 | 6.8 | 0.52 | Small | High | Good |
| | W8 | 44 | 6.6 | 0.58 | Slightly large | High | Good |
| | W9 | 43 | 6.6 | 0.54 | Slightly large | High | Good |
| | W10 | 45 | 4.6 | 0.61 | Small | High | Good |
| | W11 | 46 | 4.8 | 0.57 | Small | High | Good |
| | W12 | 46 | 4.5 | 0.80 | Small | High | Good |
| | W13 | 47 | 6.5 | 0.75 | Small | High | Good |
| | W14 | 44 | 4.3 | 0.51 | Small | High | Good |
| Comparative example | W15 | 26 | 12.2 | 1.80 | Small | Low | Bad |
| | W16 | 27 | 10.5 | 1.53 | Small | Slightly low | Bad |
| | W17 | 37 | 11.4 | 1.31 | Large | Slightly low | Bad |
| | W18 | 45 | 6.2 | 0.66 | Small | Slightly low | Bad |
| | W19 | 33 | 10.1 | 1.40 | Small | Slightly low | Bad |
| | W20 | 40 | 8.8 | 0.99 | Small | Slightly low | Bad |
| | W21 | 33 | 14.5 | 1.85 | Small | Slightly low | Bad |
| | W22 | 40 | 7.1 | 0.65 | Slightly large | Low | Bad |
| | W23 | 33 | 12.2 | 1.39 | Small | Slightly low | Bad |
| | W24 | 35 | 12.0 | 1.40 | Small | Slightly low | Bad |
| | W25 | 25 | 7.9 | 1.44 | Large | High | Bad |
| | W26 | 18 | 16.0 | 2.30 | — | — | Slightly bad |
| | W27 | 22 | 14.7 | 1.90 | Small ※ | Slightly low | Slightly bad |
| | W28 | 34 | 7.7 | 1.34 | Large | High | Slightly bad |

(note 1)
The smaller the amount of slag generated is, the better the evaluation result is.
Mark "-" indicates metal surface scarely having slag.
Mark "※" indicates that slag does not exist on whole surface of bead and there is found metal surface.
(note 2)
Slag removability: High means that slag can easily removed by striking with small hammer, slightly low means that slag cannot be removed by striking with small hammer, and low means that slag is sticking.

TABLE 4

| Classification of invention | Wire symbol | Sheath symbol | Wire type | Plated or non-Plated | Filling percentage (%) | Si | Mn | Synthetic material formed of Na2O and TiO2 | | NaO | TiO | Iron Powder | Iron component of alloy | Others |
|---|---|---|---|---|---|---|---|---|---|---|---|---|---|---|
| | | | | | | | | Raw material | Content | | | | | |
| Example of present invention | WP1 | P2 | Without butt | Plated | 3 | — | 1.0 | 13NaO—80TiO | 1.00 | — | — | 0.60 | 0.25 | Balance |
| | WP2 | P3 | Without butt | Plated | 4 | 1.4 | 0.3 | 42NaO—53TiO | 0.80 | 0.17 | 0.75 | 1.25 | 0.28 | Balance |
| | WP3 | P3 | Without butt | Non-plated | 4 | 1.0 | — | 13NaO—80TiO | 1.30 | — | 0.80 | — | 0.52 | Balance |
| | WH1 | H2 | With butt | Non-plated | 4 | — | — | 13NaO—81TiO | 1.00 | 0.25 | 1.30 | 1.10 | — | Balance |
| | WH2 | H3 | Without butt | Plated | 4 | 0.3 | 0.5 | 13NaO—82TiO | 1.00 | — | 0.70 | 1.00 | 0.28 | Balance |
| | WH3 | H3 | Without butt | Plated | 4 | 0.3 | 0.5 | 42NaO—53TiO | 1.00 | — | 0.70 | 1.00 | 0.28 | Balance |
| | WH4 | H3 | Without butt | Plated | 5.5 | 0.3 | 0.5 | 42NaO—54TiO | 1.00 | 0.17 | 1.40 | 1.30 | 0.35 | Balance |
| Comparative example | WH4 | P2 | Without butt | Plated | 4.5 | 1.0 | 1.5 | 13NaO—80TiO | 0.90 | — | — | — | 0.90 | Balance |
| | WH5 | H3 | Without butt | Plated | 6 | — | 2.3 | 13NaO—81TiO | 1.00 | 0.35 | 1.30 | — | 0.58 | Balance |

TABLE 5

| Classification of invention | Wire symbol | Arc condition | | | Slag condition | | |
|---|---|---|---|---|---|---|---|
| | | Number of transfer of globule (transfers/sec) | Standard deviation of globule transfer period | Amount of spatter generated (g/min) | Generated amount (note 1) | Removability (note 2) | Comprehensive evaluation |
| Example of present invention | WP1 | 42 | 6.3 | 0.65 | Very small | Slightly low | Good |
| | WP2 | 41 | 5.5 | 0.78 | Small | High | Good |
| | WP3 | 45 | 6 | 0.66 | Small | High | Good |
| | WH1 | 46 | 6.7 | 0.61 | Slightly large | High | Good |
| | WH2 | 43 | 5.8 | 0.68 | Small | High | Good |
| | WH3 | 45 | 5.3 | 0.75 | Small | High | Good |
| | WH4 | 42 | 6.5 | 0.81 | Slightly large | High | Good |
| Comparative | WP4 | 32 | 10.5 | 1.85 | Small | Low | Bad |
| | WH5 | 30 | 11.2 | 2.02 | Slightly large | Slightly low | Bad |

(note 1)
The smaller the amount of slag generated is, the better the evaluation result is.
Mark "-" indicates metal surface scarcely having slag.
Mark "" indicates that slag does not exist on whole surface of bead and there is found metal surface.
(note 2)
Slag removability: High means that slag can easily removed by striking with small hammer, slightly low means that slag cannot be removed by striking with small hammer, and low means that slag is sticking

TABLE 6

| Symbol | Chemical composition mass % | | | | |
|---|---|---|---|---|---|
| | C | Si | Mn | P | S |
| P 1 | 0.05 | 0.01 | 0.30 | 0.020 | 0.015 |
| P 2 | 0.04 | 1.18 | 0.20 | 0.030 | 0.020 |
| P 3 | 0.01 | 0.02 | 2.41 | 0.010 | 0.030 |
| H 1 | 0.04 | 0.01 | 0.25 | 0.015 | 0.020 |
| H 2 | 0.04 | 0.50 | 1.00 | 0.200 | 0.015 |
| H 3 | 0.02 | 0.72 | 2.15 | 0.025 | 0.020 |

TABLE 9

| Symbol | Plate thickness (mm) | Groove shape | Groove angle (°) | Route distance (mm) |
|---|---|---|---|---|
| K 1 | 19 | V shape | 22.5 | 12 |
| K 2 | 25 | V shape | 35 | 12 |

TABLE 8

| Symbol | Chemical composition mass % | | | | | JIS standard |
|---|---|---|---|---|---|---|
| | C | Si | Mn | P | S | |
| B 1 | 0.17 | 0.44 | 1.32 | 0.014 | 0.004 | SM490B |
| B 2 | 0.19 | 0.49 | 1.52 | 0.022 | 0.005 | SM520B |

TABLE 7

| Classification of invention | Wire symbol | Steel sheath symbol | presence of butt | Plated or non-plated | Filling percentage (%) | Composite compound metal oxide total wire mass % | | $Na_2O$ conversion value | $TiO_2$ conversion value |
|---|---|---|---|---|---|---|---|---|---|
| | | | | | | Synthetic matter containing $Na_2O$ and $TiO_2$ | | | |
| | | | | | | Raw material | Content | | |
| Examples of present invention | W1 | P1 | without butt | Plated | 7.0 | $13Na_2O$—$80TiO_2$ | 0.60 | — | 0.10 |
| | W2 | P1 | " | " | 6.5 | " | 0.70 | — | — |
| | W3 | P1 | " | " | 6.0 | " | 0.40 | 0.10 | — |
| | W4 | P1 | " | " | 6.0 | " | 0.50 | — | 0.05 |
| | W5 | P1 | " | " | 5.5 | " | 0.60 | — | 0.07 |
| | W6 | P1 | " | " | 4.5 | " | 0.80 | — | — |
| | W7 | H1 | with butt | non-plated | 6.0 | " | 0.30 | — | 0.50 |
| | W8 | P1 | without butt | " | 6.0 | " | 0.70 | — | 0.05 |
| | W9 | P1 | " | Plated | 10.0 | $13Na_2O$—$25SiO_2$—$80TiO_2$ | 0.70 | 0.10 | 0.60 |
| | W10 | P1 | " | " | 3.5 | $13Na_2O$—$80TiO_2$ | 0.15 | 0.25 | — |
| | W11 | P1 | " | " | 7.5 | " | 0.20 | — | 1.00 |
| | W12 | P2 | " | " | 4.0 | $43Na_2O$—$52TiO_2$ | 0.15 | — | — |
| | W13 | P3 | " | " | 5.5 | " | 0.15 | — | 0.18 |
| | W14 | H1 | with butt | non-plated | 6.0 | " | 0.30 | 0.30 | 0.40 |
| | W15 | H2 | " | " | 3.5 | " | 0.15 | — | — |
| | W16 | H3 | " | " | 8.5 | $13Na_2O$—$80TiO_2$ | 1.80 | — | — |

TABLE 7-continued

| | | | | | | | | | |
|---|---|---|---|---|---|---|---|---|---|
| Comparative examples | W17 | P1 | without butt | plated | 4.5 | " | 0.10 | — | — |
| | W18 | P3 | " | " | 7.0 | " | 0.90 | 0.50 | 0.50 |
| | W19 | P1 | " | " | 8.0 | " | 2.05 | — | — |
| | W20 | P1 | " | " | 7.0 | " | — | 0.39 | — |
| | W21 | P1 | " | " | 6.5 | " | — | — | 1.68 |
| | W22 | P1 | " | " | 2.5 | 13N$_2$O—80TiO$_2$ | 1.15 | — | 0.20 |
| | W23 | P1 | " | " | 12.0 | " | 0.50 | — | 0.50 |
| | W24 | P1 | " | " | 4.0 | " | 0.05 | 0.30 | — |
| | W25 | P2 | " | " | 7.5 | " | 0.80 | 0.03 | 0.03 |
| | W26 | H1 | with butt | non-plated | 5.5 | 43N$_2$O—52TiO$_2$ | 0.60 | — | — |
| | W27 | H2 | " | " | 9.5 | 13N$_2$O—80TiO$_2$ | 1.50 | — | 0.05 |
| | W28 | H3 | " | " | 7.5 | " | — | — | 0.25 |
| | W29 | H1 | " | " | 7.0 | 13N$_2$O—80TiO$_2$ | 0.05 | 0.05 | 0.05 |
| | W30 | Solid wire | | plated | — | — | — | — | — |

Metal compound total wire mass %. Ceq.

| Classification of invention | C | Si | Mn | Cu | Ti | B(ppm) | Mo | Ni | Cr | N(ppm) | Ceq. | iron powder | iron component of alloy iron | Others |
|---|---|---|---|---|---|---|---|---|---|---|---|---|---|---|
| Examples of present invention | 0.05 | 0.76 | 1.85 | 0.20 | 0.18 | 35 | — | — | — | 44 | 0.67 | 2.4 | 0.82 | Balance |
| | 0.05 | 0.59 | 1.85 | 0.20 | 0.23 | 35 | — | — | — | 50 | 0.70 | 1.5 | 0.72 | Balance |
| | 0.05 | 0.79 | 1.88 | 0.20 | 0.30 | 55 | 0.20 | — | — | 56 | 0.91 | 1.2 | 0.82 | Balance |
| | 0.05 | 0.67 | 1.68 | 0.20 | 0.25 | 45 | 0.18 | — | — | 39 | 0.77 | 0.4 | 1.05 | Balance |
| | 0.06 | 0.77 | 2.05 | 0.20 | 0.17 | 40 | — | — | — | 42 | 0.71 | 0.2 | 0.80 | Balance |
| | 0.06 | 0.73 | 1.25 | 0.20 | 0.25 | 35 | 0.20 | — | — | 35 | 0.68 | 0.3 | 0.51 | Balance |
| | 0.04 | 0.88 | 1.58 | | 0.24 | 55 | 0.10 | 0.60 | | 56 | 0.83 | 0.7 | 0.86 | Balance |
| | 0.05 | 0.77 | 1.55 | | 0.26 | 45 | 0.10 | | 0.30 | 51 | 0.80 | 0.7 | 0.72 | Balance |
| | 0.05 | 1.33 | 2.28 | 0.20 | 0.22 | 34 | 0.10 | | | 48 | 0.80 | 2.6 | 1.22 | Balance |
| | 0.11 | 0.32 | 0.85 | 0.20 | 0.03 | 20 | 0.20 | — | — | 45 | 0.44 | 0.6 | 0.55 | Balance |
| | 0.07 | 0.52 | 1.55 | 0.20 | 0.12 | 45 | — | 1.35 | | 40 | 0.69 | 0.9 | 1.22 | Balance |
| | 0.04 | 1.05 | 1.23 | 0.20 | 0.24 | 65 | | | 0.05 | 45 | 0.82 | 0.5 | 0.62 | Balance |
| | 0.02 | 0.41 | 2.44 | 0.20 | 0.08 | 45 | | | 0.40 | 55 | 0.70 | 1.0 | 0.55 | Balance |
| | 0.04 | 0.64 | 1.36 | | 0.27 | 35 | | | 0.80 | 44 | 0.75 | 0.6 | 0.75 | Balance |
| | 0.04 | 0.59 | 0.94 | | 0.10 | 85 | 0.15 | | | 29 | 0.74 | 0.4 | 0.34 | Balance |
| | 0.02 | 0.88 | 2.42 | | 0.05 | 10 | 0.05 | | | 29 | 0.46 | 1.8 | 1.00 | Balance |
| Comparative examples | 0.04 | 1.34 | 1.93 | 0.20 | 0.34 | 60 | | | | 35 | 0.94 | 0.3 | 0.30 | Balance |
| | 0.01 | 0.77 | 2.41 | 0.20 | 0.09 | 20 | 0.20 | | | 28 | 0.55 | 0.8 | 0.67 | Balance |
| | 0.05 | 0.25 | 3.05 | 0.20 | 0.18 | 65 | 0.20 | | | 48 | 0.94 | 0.5 | 1.63 | Balance |
| | 0.05 | 1.96 | 1.04 | 0.20 | 0.22 | 55 | | 1.10 | | 33 | 0.83 | | 0.93 | Balance |
| | 0.05 | 1.45 | 0.76 | 0.20 | 0.16 | 65 | | | 0.66 | 45 | 0.82 | 0.5 | 0.78 | Balance |
| | 0.50 | 0.41 | 0.92 | 0.20 | 0.01 | 25 | | | | 51 | 0.38 | 0.3 | 0.20 | Balance |
| | 0.04 | 0.88 | 4.05 | 0.20 | 0.18 | 25 | 0.25 | 0.30 | | 52 | 0.89 | 3.2 | 0.58 | Balance |
| | 0.16 | 0.47 | 0.98 | 0.20 | 0.15 | 15 | | 0.10 | | 42 | 0.55 | 0.5 | 0.74 | Balance |
| | 0.04 | 1.19 | 2.36 | 0.20 | 0.16 | 5 | | | | 62 | 0.60 | 1.3 | 0.66 | Balance |
| | 0.04 | 0.99 | 1.65 | | 0.06 | 110 | 0.20 | | 0.15 | 35 | 0.96 | 0.6 | 1.03 | Balance |
| | 0.04 | 0.85 | 1.82 | | 0.18 | 35 | 0.75 | | | 51 | 0.77 | 1.4 | 0.98 | Balance |
| | 0.05 | 0.85 | 1.95 | | 0.15 | 65 | | 1.79 | | 45 | 0.87 | 1.7 | 0.67 | Balance |
| | 0.05 | 0.58 | 1.78 | | 0.09 | 65 | | | 1.08 | 53 | 0.85 | 2.1 | 0.90 | Balance |
| | 0.06 | 0.70 | 1.48 | 0.20 | 0.20 | 50 | 0.20 | | | 32 | 0.74 | | | Balance |

Content of C$_1$ Si and Mn indicated total value of metal component in steel sheath and filling flux. Content of Cu indicates the amount of pl Note 2:
Mark"-" and blank of content indicate that the element is not contained in filling flux.

Note 3:
Balance includes SiO$_2$ etc. of binder and other unavoidable components.

TABLE 10

| Classification of invention | Wire Symbol | Groove | Steel plate symbol | Mechanical property | | | | | | welding workability | | | | | | | Comprehensive evalution |
|---|---|---|---|---|---|---|---|---|---|---|---|---|---|---|---|---|---|
| | | | | 02% proof stress (N/mm²) | Tensile strength (N/mm²) | Elongation (%) | Absorbed energy (2VE,J) | | Cracked or non-cracked | Depth of penetration (mm) | Arc condition | | | | slag condition | | |
| | | | | | | | -20° C. | 0° C. | | | Amount of spatter generated (g/min) | Number of transfers of globules/sec. | Standard deviation | Produced amount | Removability | | |
| Example of present invention | W1 | K1 | B1 | 443 | 524 | 28.4 | 76 | 98 | non-cracked | 7.4 | 0.78 | 44 | 8.4 | small | High | Good |
| | W2 | K1 | B1 | 454 | 544 | 29.2 | 87 | 112 | non-cracked | 7.5 | 0.88 | 41 | 7.3 | small | High | Good |
| | W3 | K1 | B1 | 501 | 582 | 28.5 | 42 | 78 | non-cracked | 7.5 | 0.76 | 40 | 7.4 | small | High | Good |
| | W4 | K1 | B1 | 458 | 550 | 27.3 | 57 | 91 | non-cracked | 7.6 | 0.84 | 44 | 8.2 | small | High | Good |
| | W5 | K1 | B1 | 435 | 536 | 26.8 | 66 | 95 | non-cracked | 7.6 | 0.86 | 43 | 7.6 | small | High | Good |
| | W6 | K1 | B1 | 455 | 541 | 28.2 | 42 | 61 | non-cracked | 7.8 | 0.76 | 45 | 8.5 | small | High | Good |
| | W7 | K1 | B1 | 478 | 570 | 29 | 69 | 101 | non-cracked | 7.5 | 0.75 | 41 | 7.5 | small | High | Good |
| | W8 | K1 | B1 | 455 | 562 | 28 | 54 | 87 | non-cracked | 7.6 | 0.81 | 44 | 7.8 | small | High | Good |
| | W9 | K1 | B1 | 473 | 557 | 28.9 | 45 | 68 | non-cracked | 7.3 | 0.69 | 46 | 7.6 | small | High | Good |
| | W10 | K1 | B1 | 436 | 512 | 26.8 | 39 | 55 | non-cracked | 8.0 | 0.72 | 41 | 7.2 | Very small | High | Good |
| | W11 | K1 | B1 | 442 | 529 | 29.4 | 86 | 105 | non-cracked | 7.6 | 0.81 | 43 | 7.5 | small | High | Good |
| | W12 | K1 | B1 | 493 | 570 | 28.6 | 57 | 93 | non-cracked | 7.9 | 0.76 | 41 | 8.6 | Very small | High | Good |
| | W13 | K1 | B2 | 480 | 551 | 28.1 | 72 | 108 | non-cracked | 7.7 | 0.91 | 42 | 8.4 | small | High | Good |
| | W14 | K1 | B2 | 459 | 567 | 29.5 | 63 | 101 | non-cracked | 7.6 | 0.90 | 41 | 8.1 | small | High | Good |
| | W15 | K2 | B2 | 504 | 595 | 28.2 | 84 | 104 | non-cracked | 8.1 | 0.66 | 47 | 7.1 | Very small | High | Good |
| | W16 | K2 | B2 | 436 | 533 | 28.7 | 57 | 75 | non-cracked | 7.4 | 0.85 | 42 | 7.9 | small | High | Good |
| Comparative example | W17 | K1 | B1 | 515 | 612 | 26.1 | 29 | 44 | non-cracked | 7.6 | 1.45 | 36 | 10.4 | small | High | Bad |
| | W18 | K1 | B1 | 421 | 485 | 29.2 | 96 | 115 | non-cracked | 7.5 | 1.36 | 43 | 8.9 | small | High | Bad |
| | W19 | K1 | B1 | 445 | 526 | 12.8 | 41 | 62 | non-cracked | 7.4 | 1.25 | 42 | 8.1 | small | High | Bad |
| | W20 | K1 | B1 | 474 | 583 | 27.5 | 23 | 40 | non-cracked | 7.5 | 1.23 | 45 | 9.2 | small | High | Bad |
| | W21 | K1 | B1 | 418 | 486 | 29.3 | 46 | 55 | non-cracked | 7.5 | 1.26 | 42 | 9.9 | small | High | Bad |
| | W22 | K1 | B1 | 488 | 585 | 26.7 | 27 | 41 | non-cracked | 8.1 | 1.18 | 40 | 9.7 | Very small | High | Bad |
| | W23 | K1 | B1 | 495 | 607 | 26.9 | 58 | 74 | cracked | 6.1 | 1.45 | 45 | 7.7 | Large | Low | Bad |
| | W24 | K1 | B1 | 508 | 609 | 26.7 | 31 | 44 | non-cracked | 7.7 | 1.19 | 40 | 9.1 | small | High | Bad |
| | W25 | K1 | B1 | 438 | 533 | 29.4 | 20 | 41 | non-cracked | 7.4 | 0.68 | 45 | 7.2 | small | High | Bad |
| | W26 | K1 | B1 | 511 | 606 | 25.8 | 34 | 43 | non-cracked | 7.5 | 0.68 | 43 | 7.2 | small | High | Bad |
| | W27 | K1 | B1 | 491 | 607 | 25.6 | 18 | 39 | non-cracked | 7.1 | 0.66 | 44 | 8.6 | small | High | Bad |
| | W28 | K2 | B2 | 522 | 631 | 24.3 | 82 | 108 | cracked | 7.6 | 0.55 | 47 | 7.2 | small | High | Bad |
| | W29 | K2 | B2 | 538 | 643 | 24.9 | 22 | 40 | non-cracked | 7.4 | 0.67 | 44 | 8.6 | small | High | Bad |
| | W30 | K1 | B1 | 471 | 552 | 29.6 | 54 | 88 | non-cracked | 8.3 | 1.43 | 25 | 12.3 | Very small | High | Bad |

What is claimed is:

1. A flux-cored wire for gas shielded arc welding, in which flux is filled in a steel sheath, containing on a total wire mass percentage 0.3 to 1.8% of Si, 0.8 to 4.0% of Mn, and 0.15 to 2.0% of a synthetic material containing $Na_2O$ and $TiO_2$, or a synthetic material containing $Na_2O$, $SiO_2$ and $TiO_2$, or both the synthetic material containing $Na_2O$ and $TiO_2$ and the synthetic material containing $Na_2O$, $SiO_2$ and $TiO_2$ as an arc stabilizer, with a flux filling percentage of 3 to 10% by mass.

2. The flux-cored wire for gas shielded arc welding according to claim 1, wherein the filling flux contains 0.3% or less of $Na_2O$ source on a $Na_2O$ conversion value basis, or 1.5% or less of $TiO_2$ source on a $TiO_2$ conversion value basis, or both 0.3% or less of $Na_2O$ source and 1.5% or less of $TiO_2$ source in addition to the synthetic material containing $Na_2O$ and $TiO_2$ or the synthetic material containing $Na_2O$, $SiO_2$ and $TiO_2$.

3. The flux-cored wire for gas shielded arc welding according to claim 1, wherein the wire further contains 0.02 to 0.15% of C, 0.02 to 0.3% of Ti, and 0.001 to 0.01% of B on a basis of total wire mass percentage.

4. The flux-cored wire for gas shielded arc welding according to claim 1, wherein the wire further contains one or more of 0.7% or less of Mo, 1.75% or less of Ni, and 1.0% or less of Cr on a basis of total wire mass percentage.

5. The flux-cored wire for gas shielded arc welding according to claim 2, wherein the wire further contains one or more of 0.7% or less of Mo, 1.75% or less of Ni, and 1.0% or less of Cr on a basis of total wire mass percentage.

6. The flux-cored wire for gas shielded arc welding according to claim 3, wherein the wire further contains one or more of 0.7% or less of Mo, 1.75% or less of Ni, and 1.0% or less of Cr on a basis of total wire mass percentage.

* * * * *